United States Patent [19]
Yasui

[11] Patent Number: 4,822,142
[45] Date of Patent: Apr. 18, 1989

[54] PLANAR DISPLAY DEVICE

[75] Inventor: Masaru Yasui, Yao, Japan

[73] Assignee: Hosiden Electronics Co. Ltd., Osaka, Japan

[21] Appl. No.: 945,701

[22] Filed: Dec. 23, 1986

[51] Int. Cl.⁴ ........................ G02F 1/133; G09G 3/36
[52] U.S. Cl. .................................... 350/332; 350/333; 350/339 F; 340/784
[58] Field of Search ............ 350/332, 333, 334, 339 F; 340/784, 702, 765

[56] References Cited

U.S. PATENT DOCUMENTS

| | | | |
|---|---|---|---|
| 4,368,523 | 1/1983 | Kawate | 350/333 |
| 4,600,274 | 7/1986 | Mozazumi | 340/784 |
| 4,642,628 | 2/1987 | Murata | 340/784 |
| 4,680,580 | 7/1987 | Kawahara | 340/784 |
| 4,701,799 | 10/1987 | Yoshimura | 340/784 |
| 4,745,406 | 5/1988 | Hayashi et al. | 350/341 |

FOREIGN PATENT DOCUMENTS

| | | | |
|---|---|---|---|
| 0158367 | 10/1985 | European Pat. Off. | 350/332 |
| 0189214 | 7/1986 | European Pat. Off. | 350/332 |
| 0186086 | 7/1986 | European Pat. Off. | 350/334 |
| 0131522 | 7/1985 | Japan | 350/333 |

OTHER PUBLICATIONS

B. Lechner–"Liquid Crystal Matrix Displays", pp. 1566–1579–Proceedings of the IEEE–vol. 59, No. 11–Nov. 1971.

*Primary Examiner*—Stanley D. Miller
*Assistant Examiner*—Tai V. Duong
*Attorney, Agent, or Firm*—Pollock, Vande Sande & Priddy

[57] ABSTRACT

A planar display device is disclosed, which comprises a plurality of display elements in rows and columns, row drive lines each commonly connected to two adjacent rows of display elements and column drive lines are provided in pairs each for each column of display elements, every other one of the display elements in a column being connected to one of the pair of column drive lines, and the other display elements in the column being connected to the other column drive lines in the pair. Each of the display elements is selectively activated by the row and column drive lines connected thereto.

6 Claims, 7 Drawing Sheets

PLANAR DISPLAY DEVICE

BACKGROUND OF THE INVENTION

This invention relates to a planar display device for displaying a monochromatic or color image as a liquid crystal display, plasma display, light-emitting diode display, etc. with a plurality of display elements arranged in rows and columns.

As the prior art, a color liquid crystal display device will be described to point out problems in this type of planar display device.

Referring to FIG. 1, there is shown a liquid crystal display device which comprises a pair of transparent substrates 11 and 12 and liquid crystal 13 sealed therebetween. A plurality of transparent square display electrodes $\mathbf{1}_{l,n}$($l$=1, 2, 3, . . . , n=1, 2, 3, . . . ) are provided on the inner surface of one of the transparent substrates, i.e., substrate 11. A transparent common electrode 14 is provided on the entire inner surface of the other substrate 12.

The display electrodes $\mathbf{1}_{l,n}$ are arranged in rows and columns. As shown in FIG. 2, a row drive line $\mathbf{2}_l$ is provided along a corresponding one of the rows of display electrodes $\mathbf{1}_{l,n}$, and a column drive line $\mathbf{3}_n$ is provided along corresponding one of columns of display electrodes $\mathbf{1}_{l,n}$. A thin-film transistor $\mathbf{4}_{l,n}$ is provided for each display electrode $\mathbf{1}_{l,n}$. Each thin-film transistor $\mathbf{4}_{l,n}$ has a drain connected to the corresponding display electrode $\mathbf{1}_{l,n}$, a gate connected to the corresponding row drive line $\mathbf{2}_l$ and a source connected to the corresponding column drive line $\mathbf{3}_n$. Thus, when one row drive line $\mathbf{2}_l$ and one column drive line $\mathbf{3}_n$ are selectively driven, only the thin-film transistor $\mathbf{1}_{l,n}$ connected to these row and column lines is turned on, i.e., rendered conductive. The corresponding display electrode $\mathbf{1}_{l,n}$ is thus connected to the column drive line $\mathbf{3}_n$, and a voltage is applied between the display electrode $\mathbf{1}_{l,n}$ and the common electrode 14 (FIG. 1). The pertaining portion of the liquid crystal 13 thus is controlled so that it has different light transmission characteristics from those of the rest of the liquid crystal. In this manner, voltage is selectively applied to the plurality of display electrodes $\mathbf{1}_{l,n}$ according to an image to be displayed, whereby a monochromatic pixel display is obtained. Each of the display electrodes $\mathbf{1}_{l,n}$ and the corresponding one of the thin-film transistors $\mathbf{4}_{l,n}$, the corresponding portion of liquid crystal 13 and the common electrode 14 constitute, in all, one of display elements $\mathbf{5}_{l,n}$.

For the color display, a red filter R, a green filter G and a blue filter B are provided on either respective display electrodes $\mathbf{1}_{l,n}$ or on the corresponding portions of the common electrode 14. These color filters are arranged substantially uniformly, for instance as shown in FIG. 3. Various colors can be displayed as mixtures of the red, green and blue colors depending on the state of display by the plurality of display elements corresponding to the respective display electrodes. Hereinafter, the display elements for displaying the red color will be referred to as R, the display elements for displaying the green color as G, and the display elements for displaying the blue color as B.

For displaying a white picture point (i.e., a white dot) on the planar color display device, three color display elements, i.e., red, green and blue display elements adjacent to one another, have to be driven simultaneously for white color emission. White horizontal and vertical lines can be displayed simply by activating the corresponding row and column of color display elements R, G and B. A 45-degree white oblique line from the right top to the left bottom of the display device can also be displayed by selectively activating color display elements R, G and B along the oblique line, as shown in FIG. 4. However, when color display elements are selected along a 45-degree oblique line from the left top to the right bottom on the display device, only one of the three colors, e.g. red display elements R are displayed and a white line can not be display, as shown in FIG. 5. This problem arises if it is intended to have one picture element (i.e., point, dot or pixel) constituted by one display element, i.e., if each display element is intended to be used as a resolvable picture element so that a thin oblique or curved display line can be achieved.

From this standpoint, it is desired to adopt a three-color display element set for a picture dot, in which a set of three adjacent color display elements, i.e., red, green and blue color display elements R, G and B, are simultaneously driven for display of a white picture point, and also any other desired color is displayed as a picture point (i.e., dot) of a resultant color of suitable combination of light intensities through the three color display elements. To this end, it is possible to form sets of color display elements using each two adjacent rows of color display elements as shown in FIG. 6. More specifically, it can be arranged to have adjacent red, green and blue display elements R, G and B in two adjacent element rows as a set, as shown in FIG. 6, thus defining color display element sets each shown enclosed by a phantom line, these sets constituting respective picture points $P_{i,j}$ (i=1, 2, 3, . . . , j=1, 2, 3, . . . )

For the display on the planar display device, one row drive line $\mathbf{2}_l$ is selectively driven via a row drive circuit 17 according to the contents of a row register 16, while one column drive line $\mathbf{3}_n$ is selectively driven via a column drive circuit 19 according to the contents of a column register 18, as shown in FIG. 2, thus causing the display of a corresponding display electrode. In the column register 18, video signal data for one display line is stored in correspondence to individual display elements $\mathbf{5}_{l,n}$ of the display line. After the display of this line, the next row drive line is selectively driven, and image signal data for the next line of the display element row to be displayed is stored in the column register 18. Likewise, successive row drive lines are selectively driven while storing image signal data for a line in the column register 18 after selection of each row drive line.

For the display through representation by sets of three-color display elements as respective picture points as shown in FIG. 6 using the system of FIG. 2, one display row $\mathbf{6}_i$ is displayed as follows. As the image signal, three color element signals $R_k$, $G_k$ and $B_k$ (k=1, 2, 3, . . . ) for each picture point (i.e., dot) are supplied as parallel signals, as shown in FIG. 7. Each set of these three color element signals will be referred to as a pixel signal or dot signal, and a color video signal comprises a series of pixel signals. The individual pixel signals in the video signal for one display row are divided into two signals, i.e., one being a stream of color element signals $R_1$, $B_1$, $G_2$, $R_3$, $B_3$, $G_4$, . . . loaded in the column register 18 as shown in FIG. 8A and the other being a stream of color element signals $G_1$, $R_2$, $B_2$, $G_3$, $R_4$, $B_4$, . . . as shown in FIG. 8B. First, the signals shown in FIG. 8A stored in the column register 18 in FIG. 2 are provided to activate the color display elements connected to the corresponding row drive line $2_l$ and individual column drive lines $3_n$, $3_{n+1}$, $3_{n+2}$, . . . . Then, the signals shown in FIG. 8B stored in the column register 18 are provided to activate the color display elements connected to the row drive line $2_{l+1}$. In the above way, the display signal for one display row (i.e., one horizontal scanning line cycle) is divided into two streams of color element signals for driving display elements independently. Therefore, the operation is complicated. Besides, since the video signal is usually supplied for each display row, i.e., each horizontal scanning line, the aforementioned display system is inferior in view of the matching with the divided two streams of input video signals.

Furthermore, in the planar display device the display surface is repeatedly scanned by selecting successive row drive lines. If the repetition cycle period of scanning the display area (i.e., vertical cycle period), i.e., one frame display period, is long, flicker of the display surface screen occurs to deteriorate the quality of display. For this reason, it is difficult to set the vertical cycle period to be longer than about 1/50 second. Since the vertical cycle period is fixed, by increasing the row drive lines the period of driving one row drive line is reduced. Therefore, this leads to a problem in the case of a liquid crystal display drive in that display electrodes fail to be charged sufficiently. That is, there is an upper limit on the number of row drive lines, and the resolution can not be improved beyond this limit. Even in case of a display device having high response speed compared to the liquid crystal display device, increasing the row drive lines requires an increase in the rate of switching of the two drive lines, thus leading to expensive and complicated peripheral circuits.

SUMMARY OF THE INVENTION

It is an object of the present invention to provide a planar display device which is capable of displaying a picture of graphic pattern with high quality.

According to the invention, row drive lines are each provided for two adjacent rows of display elements. That is, the display elements in the two rows are connected to the common row drive line. Column drive lines are provided in pairs each for each column of display elements. Every other one of the display elements in the column are connected to one of the pair column drive lines, and the other display elements in the column are connected to the other column drive lines in the pair. Each of the display elements is selectively displayed by the row and column drive lines connected to it.

DETAILED DESCRIPTION OF THE PREFERRED EMBODIMENTS

Figure 9:
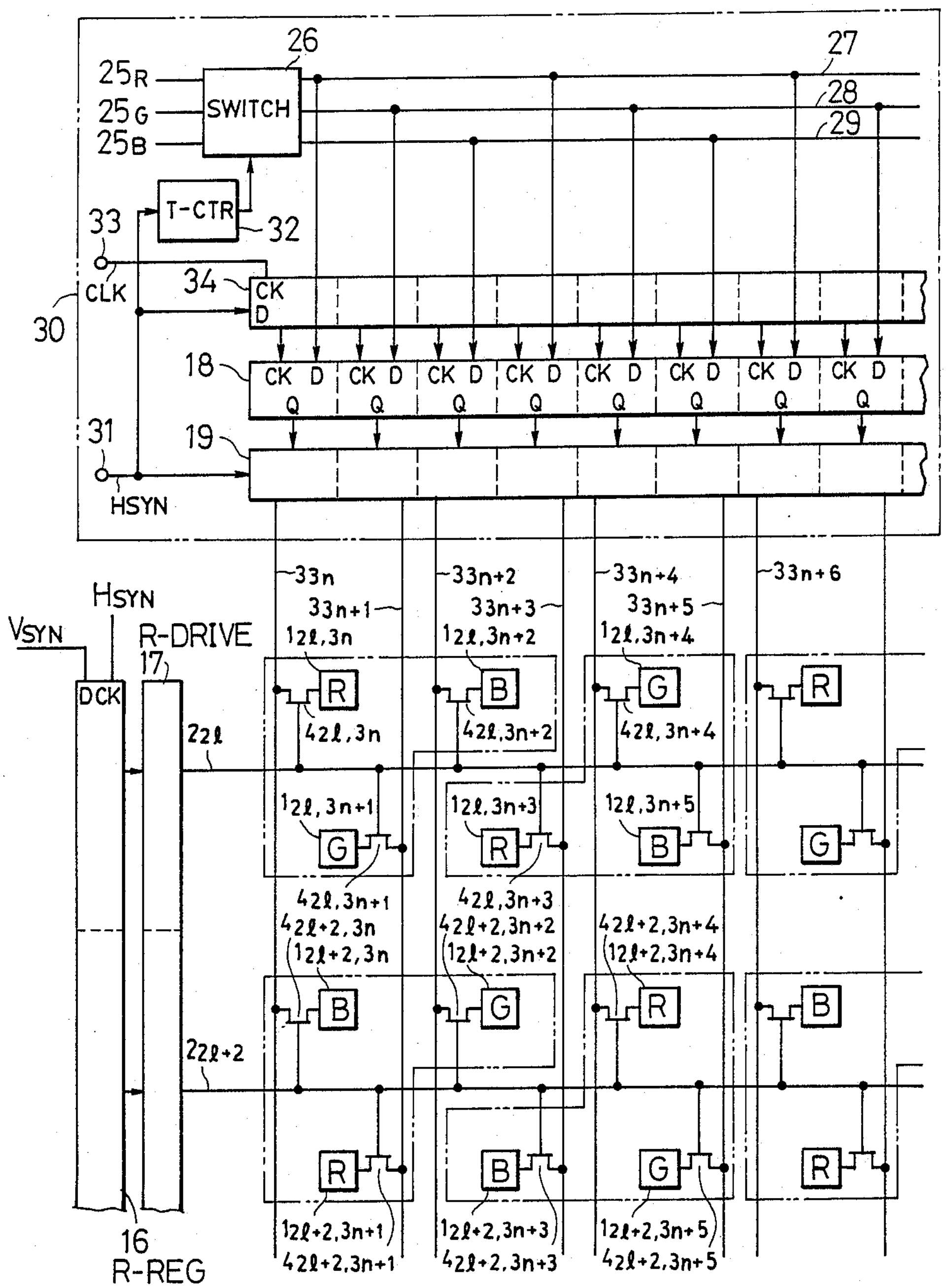
FIG. 9 is a view showing the relation among display electrodes, column drive lines, row drive lines and thin-film transistors where a planar display device according to the invention is applied to the liquid crystal display.

Now, an embodiment of the invention applied to a liquid crystal planar display device will be described. The embodiment employs the structure shown in FIG. 1. However, the embodiment is different from the prior art system in the arrangement and interconnection of the display electrodes and row and column drive lines. FIG. 9 is a view similar to FIG. 2 but shows the embodiment of the invention. Referring to FIG. 9, display electrodes $1_{2l,3n}$ are arranged in rows and columns. Unlike the prior art system, row drive lines $2_{2l}$ are each provided for two adjacent rows of display electrodes $1_{2l,3n}$. In the illustrated example, one row of display electrodes $1_{2l,3n}$, $1_{2l,3n+2}$, . . . is provided above the row drive line $2_{2l}$, and the other row of display electrodes $1_{2l,3n+1}$, $1_{2l,3n+3}$, . . . is provided below the line. Two column drive lines are provided for each column of display electrodes. For example, column drive lines $3_{3n}$ and $3_{3n+1}$ are provided on the opposite sides of the column of display electrodes $1_{2l,3n}$, $1_{2l,3n+1}$, . . . .

Thin-film transistors $4_{2l,3n}$ are each provided for each of the display electrodes $1_{2l,3n}$. To the row drive line $2_{2l}$ are connected the gates of thin-film transistors corresponding to the display electrodes, between which the drive line $2_{2l}$ extends. The display electrodes in each column are connected alternately and through the respective thin-film transistors to the column drive lines on the opposite sides of the column. For example, the display electrodes $1_{2l,3n}$, $1_{2l+2,3n}$ are connected through the respective thin-film transistors $4_{2l,3n}$, $4_{2l+2,3n}$, . . . to the column drive line $3_{3n}$, and the display electrodes $1_{2l,3n+1}$, $1_{2l+2,3n+1}$, . . . are connected through the respective thin-film transistors $4_{2l,3n+1}$, $4_{2l+2,3n+1}$, . . . to the column drive line $3_{3n+1}$. Again in this structure, each display electrode constitutes together with the corresponding thin-film transistor and corresponding portions of the liquid crystal and common electrode (FIG. 1) a display element 5.

In the case of the color display, red, green and blue color filters R, G and B are provided substantially in a uniform arrangement in correspondence to the individual pixel electrodes.

In this construction, a column control/drive circuit 30 is arranged as follows: The red, green and blue color element signals $R_k$, $G_k$ and $B_k$ constituting each pixel signal supplied through in parallel from input lines 25R, 25G and 25B to a color signal switching circuit 26. Each horizontal sync pulse $H_{syn}$ of the color video signal is supplied from a horizontal sync input terminal 31 to a tertiary counter 32. The color signal switching circuit 26 is controlled to switch the color element signals according to the count of the tertiary counter 32. According to the control the color signal switching circuit 26 connects the input signal lines 25R, 25G and 25B to color signal buses 27, 28 and 29, or 28, 29 and 27, or 29, 27 and 28, respectively.

The color signal buses 27 to 29 are repeatedly connected to successive stages of the column register 18, and the outputs of these stages drive the column drive lines $3_{3n}$, $3_{3n+1}$, $3_{3n+2}$, $3_{3n+3}$, $3_{3n+4}$, $3_{3n+5}$, . . . through the column drive circuit 19. A clock signal having three times the dot frequency of the input color video signal is supplied as a shift clock from a clock terminal 33 to a shift register 34, and a horizontal sync pulse is supplied as data from the terminal 31 to the first stage of the shift register 34 at the start of each horizontal scanning cycle period. Data from the individual stages of the column register 18 are fetched successively in response to the outputs of the respective shift stages of the shift register 34.

Figure 2:
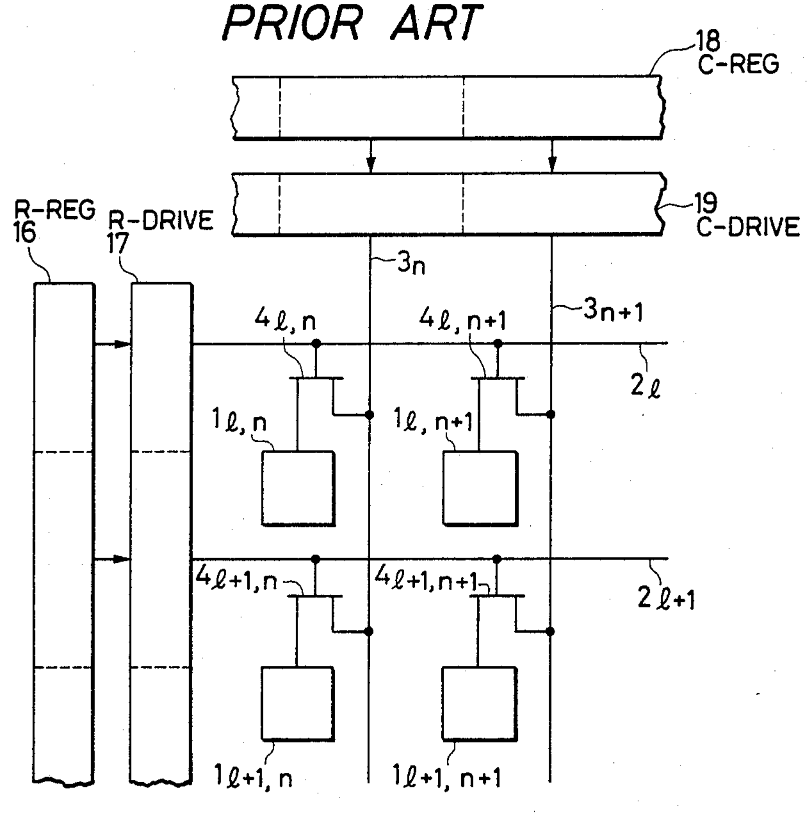
FIG. 2 PRIOR ART
FIG. 2 is a view showing the relation among display electrodes, drive lines and thin-film transistors of a prior art liquid crystal display device.
Figure 3:
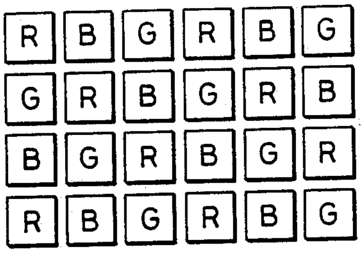
FIG. 3 PRIOR ART
FIG. 3 is a view showing an example of an arrangement of color filters in the prior art liquid crystal display device.
Figure 4:
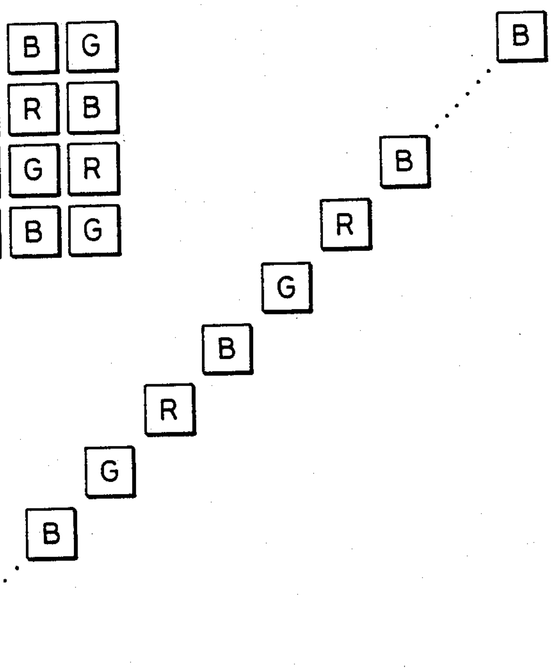
FIG. 4 PRIOR ART
FIG. 4 is a view showing a 45° display line of a prior art array of display elements extending from upper right to lower left.
Figure 5:
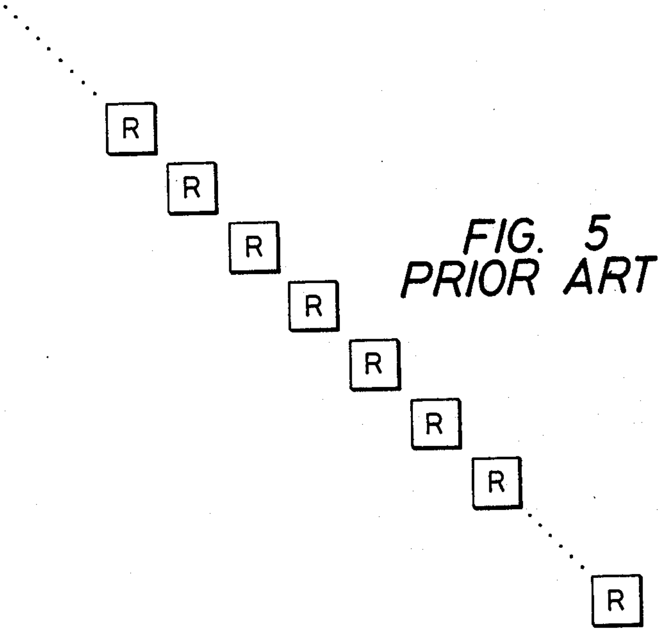
FIG. 5 PRIOR ART
FIG. 5 is a view showing a 45° display line of a prior art array of display elements extending from upper left to lower right.
Figure 6:
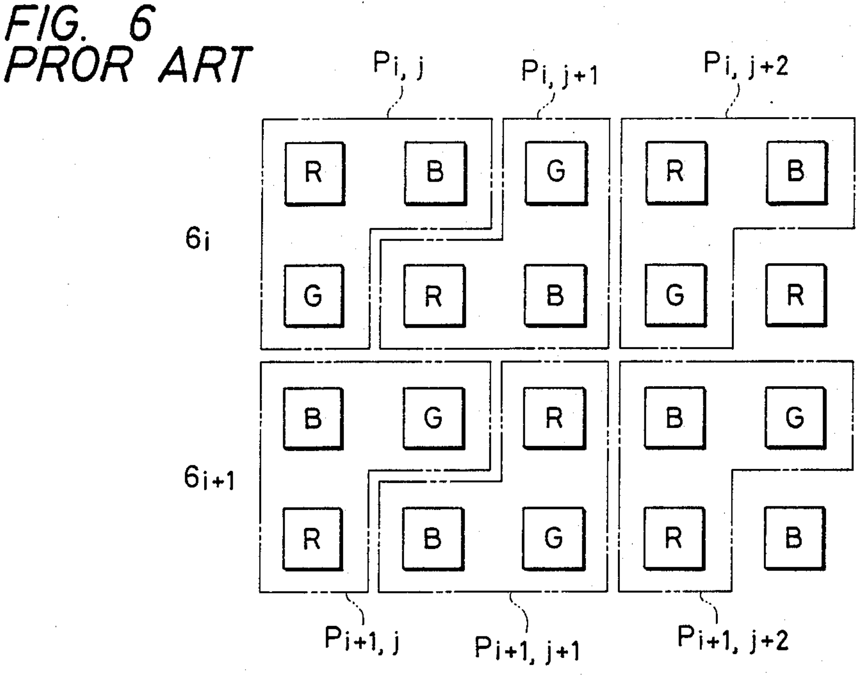
FIG. 6 PRIOR ART
FIG. 6 is a view showing an example of a prior art display as three-color display-element sets as picture dots.
Figure 7:
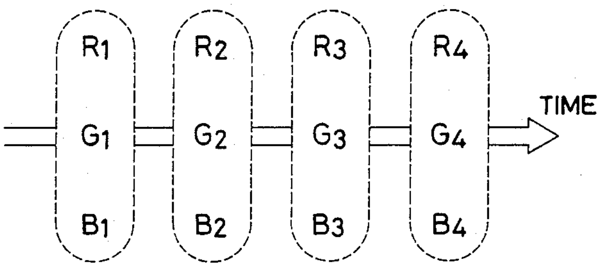
FIG. 7 PRIOR ART
FIG. 7 is a view showing an example of image signal train.
Figure 8A:
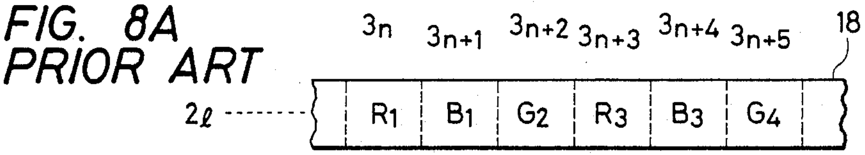
FIG. 8A PRIOR ART
FIGS. 8A and 8B show streams of divided image signal stored in the column register 18 for activation of three-color display-element sets as respective picture dots on the prior art display device shown in FIG. 2.
Figure 8B:
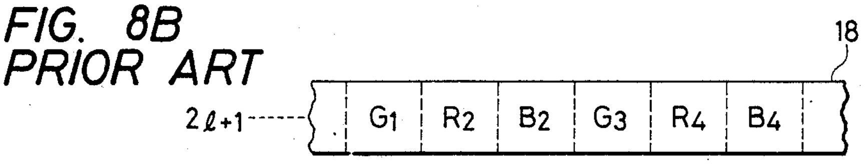
FIG. 8B PRIOR ART
Figure 10A:
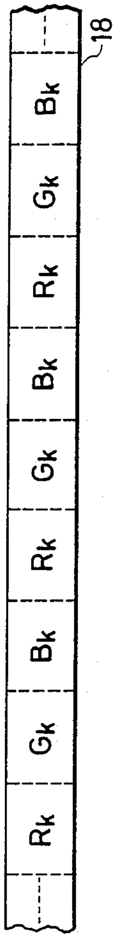
FIGS. 10A, 10B and 10C show an example of a color video signal stored in the column register 18 shown in FIG. 9.

The row drive lines $2_{2l}$, $2_{2l+2}$, . . . are successively driven in synchronism with the horizontal sync pulses $H_{SYN}$ by the conventional arrangement of row register 16 and row drive circuit 17 similar to the arrangement shown in FIG. 2. Thus, when red, green and blue color element signals $R_k$, $G_k$ and $B_k$ are stored as the video signal of a certain horizontal cycle period in the manner as shown in FIG. 10A in the column register 18 and the row drive line $2_{2l}$ is driven at this time, all the display elements (i.e., display electrodes) in the two rows associated with the row drive line $2_{2l}$ shown in FIG. 9 are driven according to the contents of the corresponding stages of the column register 18. Thus, the three-color display-element sets of respective picture elements are simultaneously driven for one display row.

Figure 10B:
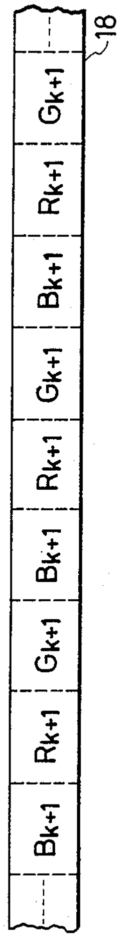
Figure 10C:
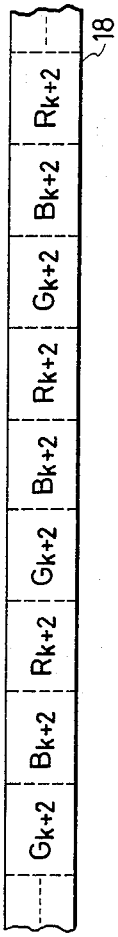

In the next horizontal cycle, color element signals are stored in the manner as shown in FIG. 10B in the column register 18, and the row drive line $2_{2l+2}$ is driven. Thus, the display elements associated with the row drive line $2_{2l+2}$ shown in FIG. 9 are driven likewise as simultaneous drive for one display row. In the further horizontal cycle, color element signals are stored in the manner as shown in FIG. 10C in the column register 18, and the row drive line $2_{2l+4}$ is driven. Thus, the display elements associated with the row drive line $2_{2l+4}$ are driven as simultaneous drive for one display row. The video signal is stored successively and repeatedly in the order of FIGS. 10A to 10C for respective horizontal periods in the column register 18. It is possible to arrange that the color element signals on the color signal buses 27 to 29 are stored simultaneously in three stages of the column register 18 for each dot of the input video signal.

Figure 11:
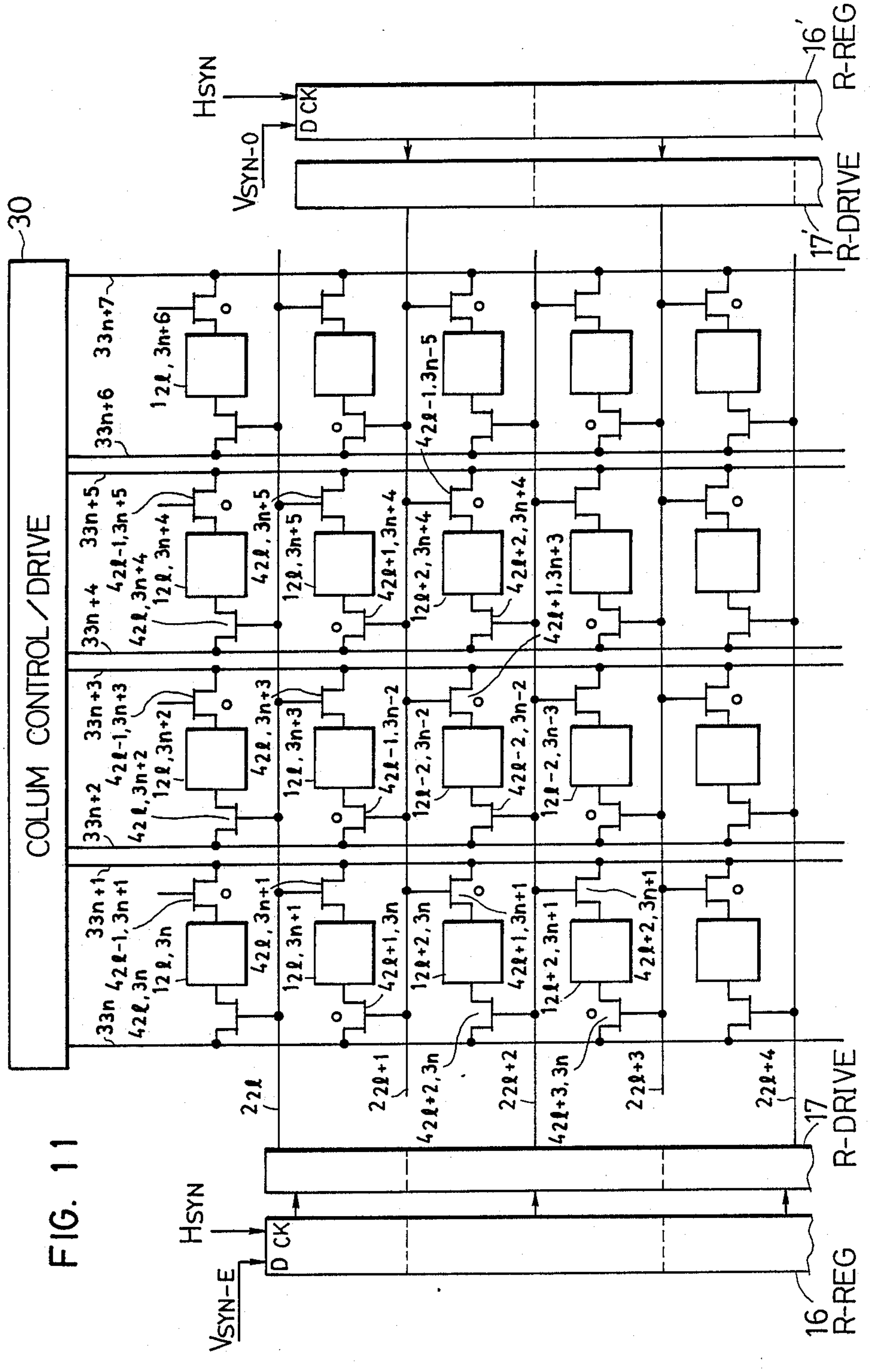
FIG. 11 is a view similar to FIG. 9 but showing a second embodiment of the invention.

FIG. 11 shows a second embodiment of the invention. In the first embodiment of FIG. 9, each row drive line $2_{2l}$ is provided for every two rows of display elements. In this second embodiment, however, each row drive line is provided for each display element row. That is, row drive lines $2_{2l+1}$, $2_{2l+3}$, . . . are provided additionally to the embodiment of FIG. 9. To each of these additional row drive lines are connected display elements on the opposite sides, i.e., on the upper and lower sides of the additional row drive line in the Figure. Each display element is also connected to the column drive lines or opposite sides thereof. In more specific, there are provided, on opposite sides of the row drive line, for example, $2_{2l+1}$, additional thin-film transistors (labeled by circles) $4_{2l+1,3n}$, $4_{2l+1,3n+2}$, . . . , and $4_{2l+1,3n+1}$, $4_{2l+1,3n+3}$, . . . on one sides of the respective display electrodes $1_{2l,3n+1}$, $1_{2l,3n+3}$, . . . , and $1_{2l+2,3n}$, $1_{2l+2,3n+2}$, . . . , opposite respectively from those thin-film transistors $4_{2l,3n+1}$, $4_{2l,3n+3}$, . . . and $4_{2l+2,3n}$, $4_{2l+2,3n+2}$, . . . shown in FIG. 9. These additional thin-film transistors on opposite sides of the additional row drive line $2_{2l+1}$ have gates connected to the row drive line $2_{2l+1}$, drains connected to the corresponding display electrodes and sources connected to the corresponding column drive lines on the sides of the respective display electrodes opposite from those column drive lines connected to the thin-film transistors having no circle label. That is, the thin-film transistors $4_{2l+1,3n}$, $4_{2l+1,3n+2}$, . . . , and $4_{2l+1,3n+1}$, . . . $4_{2l+1,3n+3}$, . . . have their drains connected to the respective opposite side display electrodes $1_{2l,3n+1}$, $1_{2l,3n+3}$, . . . and $1_{2l+2,3n}$, $1_{2l+2,3n+2}$, . . . , their sources connected to the respective column drive lines $3_{3n}$, $3_{3n+2}$, . . . , and $3_{3n+1}$, $3_{3n+3}$, . . . and their gates commonly connected to the row drive line $2_{2l+1}$. In a similar manner, additional thin-film transistors are provided for each of the other additional row drive lines.

The column control/drive circuit 30 for the column drive lines $3_{3n}$, $3_{3n+1}$, . . . may be substantially the same as that shown in FIG. 9. Two sets of row register and row drive circuits 16, 17 and 16' 17' are provided, one set for driving even row drive lines $2_{2l}$, $2_{2l+2}$, . . . , and the other set for driving odd row drive lines $2_{2l+1}$, $2_{2l+3}$, . . . . As shown in FIG. 11, each of the two sets is similar to the conventional set shown in FIG. 2. The row registers 16 and 16' are respectively supplied with even field vertical sync signal $V_{SYN\text{-}E}$ and odd field vertical sync signal $V_{SYN\text{-}O}$, which are shifted in synchronism with the horizontal sync pulses $H_{SYN}$, whereby even row drive lines $2_{2l}$, $2_{2l+2}$, . . . are successively selected in an even field by the row drive circuit 17 and then odd row drive lines $2_{2l+1}$, $2_{2l+3}$, . . . are successively selected in an odd field by the row drive circuit 17', and the scannings of even and odd fields are alternately repeated.

Figure 13:
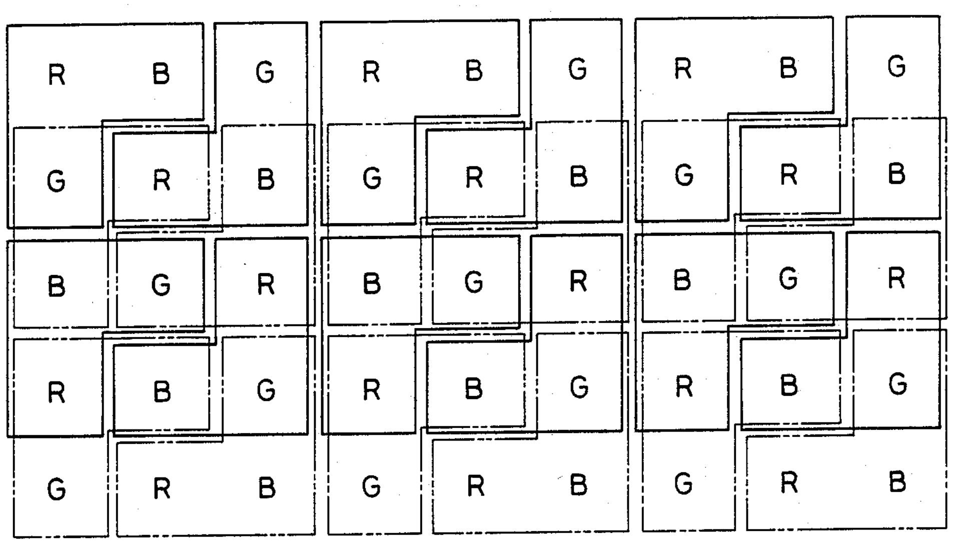
FIG. 13 is a view showing an example of interlaced scanning in the second embodiment.

With the second embodiment shown in FIG. 11, it is possible to display one field, say, an even field by three-color display-element sets for respective picture dots as shown by solid lines in FIG. 13 using the row drive lines $2_{2l}$, $2_{2l+2}$, . . . and then to display one field, say, an odd field by three-color display-element sets for respective picture dots as shown by phantom lines using the row drive lines $2_{2l+1}$, $2_{2l+3}$, . . . . By repeating the alternate displays shown by the solid and phantom lines in FIG. 13, it is possible to obtain a display well matched to the interlaced scanning video signal and also improve the resolution in the direction of the column drive lines.

In either the first or second embodiment, two rows, i.e., upper and lower side rows of display elements are connected to each row drive line, so that two rows of display elements can be displayed while a single row drive line is being selected. Thus, the row drive lines can be reduced in number to one half compared to the row drive lines in the prior art arrangement shown in FIG. 2. This means that for the same period, during which each row drive line is selectively driven, the driving period for one frame can be reduced to one half, resulting in reduced flicker and improved quality of the displayed image. Alternatively, for the same frame display period, e.g., 1/60 second, the number of display element rows can be doubled to increase the resolution correspondingly. Further, for the same number of display element rows, the period of driving of one row drive line can be doubled compared to the prior art system. That is, the drive speed can be reduced to permit simpler construction of the peripheral circuits. Further, in the case of the liquid crystal display, the charging period for each of the display electrodes can be extended so that it is possible to obtain a display image having an improved contrast.

Although the number of column drive lines is doubled compared to the prior art system, the number of row drive lines is reduced to one half, so that the design and manufacture of the device will not become difficult.

Where the prior art planar display device is used for the color display of the type where each picture point (or dot) is represented by a set of three color display elements, the row drive line has to be driven twice for the display of one display row. In other words, the display device is scanned twice during one horizontal scanning cycle period of the video signal. Therefore, the correspondence to the video signal is unsatisfactory in view of displaying the video signal supplied for each horizontal scanning cycle period. According to the invention, the video signal supplied for each horizontal scanning cycle period is displayed by driving each row drive line only once for one horizontal scanning line period. Nevertheless, the display thus obtained for one display row consists of three-color display element sets as respective picture points. The display device according to the invention thus has a satisfactory matching property with respect to the input of the video signal.

Figure 12:
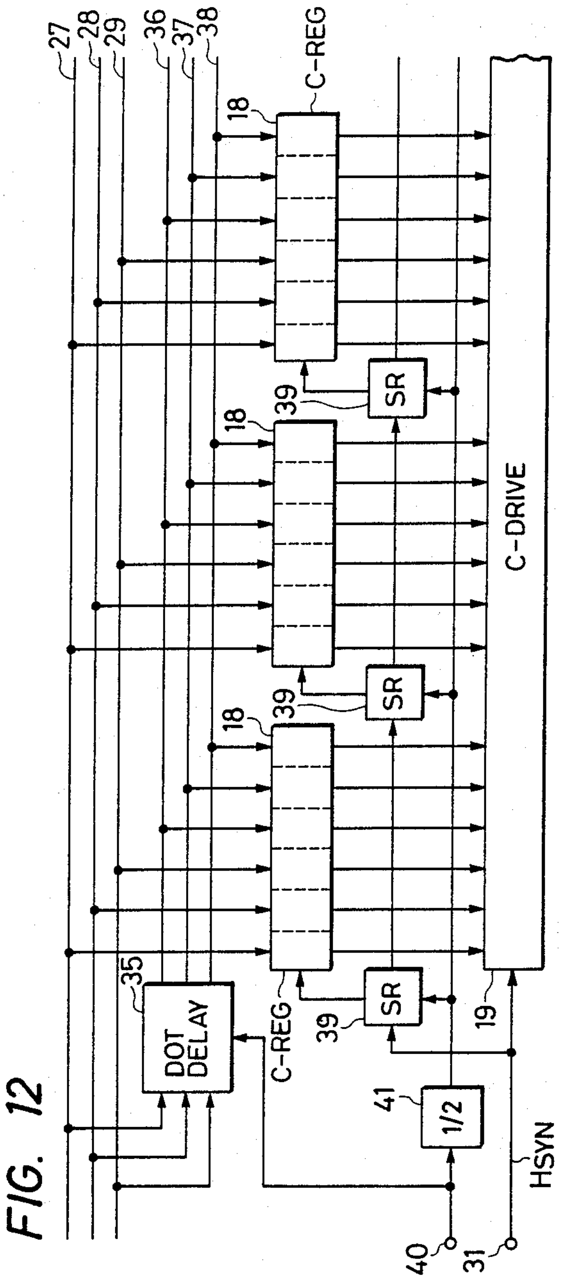
FIG. 12 is a view showing a different example of a circuit for supplying an image signal to the display device according to the invention.

According to the invention, three color element signals for each picture point can be simultaneously input to the column register 18 as mentioned earlier. Further, it is possible to store three color signals for two or three picture points simultaneously in the column register 18. For example, as shown in FIG. 12, it is possible that the color signal buses 27 to 29 are connected through a one-dot delay circuit 35 to color signal buses 36 to 38, and the color element signals 27 to 29 and 36 to 38 are successively and repeatedly connected to individual stages of the column register 18. In this case, the column register 18 is divided into groups each consisting of ;b 6 stages, a horizontal sync pulse $H_{syn}$ is supplied to the first stage of a shift register 39 and shifted therethrough in response to the output of a frequency divider 41, which divides the frequency of a dot clock from a terminal 40 to one half, and writing of data in one of the groups of the column register 18 is effected according to the output of each stage of the shift register 39. In this way, the input video signal is stored as six color element signals for two picture dots at a time in the column register 18.

Further, in the second embodiment a twofold path is provided for the driving of each display element. That is, even if one of the two paths is defective, the display element may be driven through the other path. This means a corresponding increase in the production yield.

While the above embodiments of the invention have been concerned with liquid crystal planar display devices, the invention is applicable to planar display devices based on light-emitting diodes or plasma display as well.

As for the driving of the liquid crystal, longer life can be ensured by AC driving. From this standpoint, it may be possible in the second embodiment (FIG. 11) to drive the liquid crystal with positive voltage for the column drive lines $3_{3n}$, $3_{3n+2}$, $3_{3n+4}$ . . . and with negative voltage for the column drive lines $3_{3n+1}$, $3_{3n+3}$, $3_{3n+5}$, . . . . However, when a certain column drive line $3_{3n}$ is disconnected, the portion of liquid crystal corresponding to display elements each connected to both the column drive lines $3_{3n}$ and $3_{3n+1}$ on the side beyond the point of disconnection opposite from the power supply, is driven solely by the positive voltage through the column drive line $3_{3n}$. The life of this portion of liquid crystal would be thus shortened.

Figure 1:
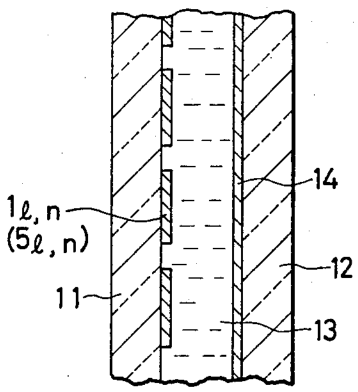
FIG. 1 PRIOR ART
FIG. 1 is a sectional view showing, in a simplified form, the general construction of a prior art liquid crystal display device.
Figure 14:
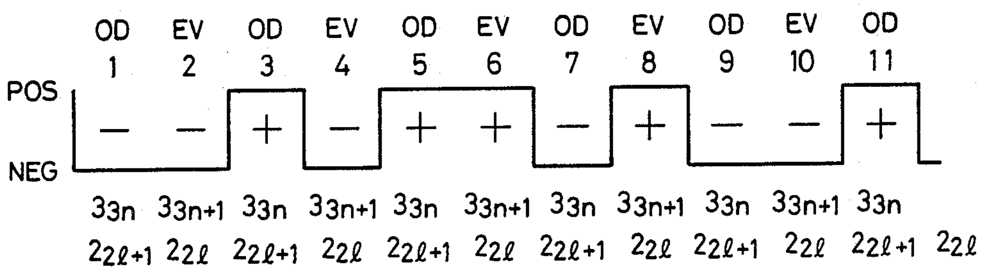
FIG. 14 is a view showing the relation among a liquid crystal AC drive signal, each field and column and row drive lines.

This drawback can be overcome by a driving scheme shown in FIG. 14. Let it be taken as an example of the display electrode $1_{2l,3n+1}$ connected via thin-film transistors to the column drive lines $3_{3n}$ and $3_{3n+1}$ simultaneously driven by either positive or negative voltage. For the first field (odd field) the row drive line $2_{2l+1}$ is selected to turn ON the thin-film transistor $4_{2l+1,3n}$, whereby a negative voltage is applied across the liquid crystal at the display electrode $1_{2l,3n+1}$ by negative voltage supplied from the line $3_{3n}$, for the second field (even field) the row drive line $2_{2l}$ is selected to turn ON the transistor $4_{2l,3n+1}$, whereby a negative voltage is applied across the liquid crystal at the same display electrode by negative voltage supplied from the line $3_{3n+1}$, for the third field (odd field) the line $2_{2l+1}$ is selected to turn ON the transistor $4_{2l+1,3n}$, whereby a positive voltage is applied across the liquid crystal by positive voltage supplied from the line $3_{3n}$, and for the fourth field (even field) the line $2_{2l}$ is selected, whereby a negative voltage is applied across the liquid crystal by negative voltage supplied from the line $3_{3n+1}$. For the subsequent fields, the drive control is carried out as shown in FIG. 14. As will be seen from FIG. 14, the drive control sequence pattern repeats for every eight successive fields. The pattern shown in FIG. 14 is only an example of the driving waveform, and it is also possible to use a pattern which is shifted in phase by one field period with respect to the pattern of FIG. 14. When applying a positive or negative voltage to the column drive lines, zero voltage is applied to the common electrode 14 (FIG. 1).

For the AC driving of the liquid crystal irrespective of the disconnection of a row drive line, the following procedure is effective. Taking the row drive lines $2_{2l}$ and $2_{2l+1}$ as an example, for the first field, during which the row drive line $2_{2l+1}$ is driven, a negative voltage is applied across the liquid crystal at the respective display electrodes supplied from all the selected column drive lines, for the second field, during which the row drive line $2_{2l}$ is driven, negative voltage is supplied to all the selected column drive lines, for the third field, during which the row drive line $2_{2l+1}$ is driven, positive voltage is supplied to all the selected column drive lines, and for the fourth field negative voltage is supplied to all the selected column drive lines.

Figure 15:
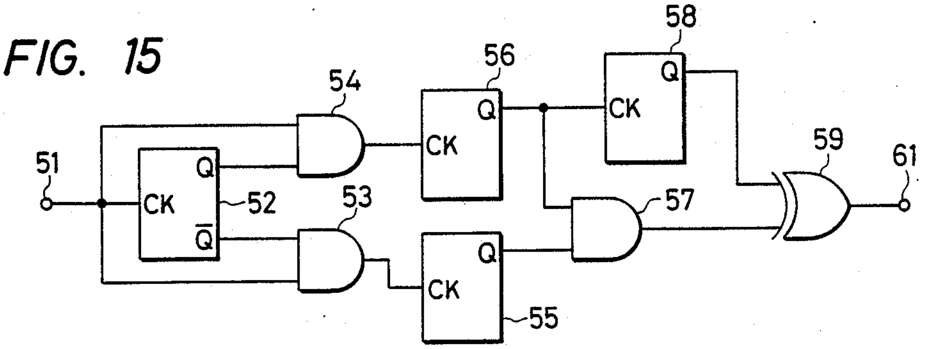
FIG. 15 is a view showing an example of a circuit for producing the AC drive waveform shown in FIG. 14.

The waveform as shown in FIG. 14 may be obtained with an arrangement as shown in FIG. 15, for instance. The vertical sync pulse signal supplied from a terminal 51 is frequency divided into one half the frequency in a flip-flop 52. The $\overline{Q}$ and Q outputs of the flip-flop 52 are used to control gates 53 and 54 to separate the input vertical sync pulses into even and odd field pulses. The separated pulse signals are frequency divided into one half the frequency in respective flip-flops 55 and 56. The outputs of these flip-flops are ANDed in an AND gate 57. Meanwhile, the output of the flip-flop 56 is frequency divided into one half the frequency in a flip-flop 58. The outputs of the flip-flop 58 and AND gate 57 are exclusively ORed in an exclusive OR gate 59. As a result, an intended output is obtained at an output terminal 61.

What is claimed is:

1. A planar display device comprising:

a plurality of display elements respectively defined by display electrodes arrayed in rows and columns to form a matrix array of said display elements;

a plurality of first thin film transistors each having a drain source, drain and gate formed adjacent a corresponding one of said display electrodes, each of said first transistors having its drain connected to a corresponding one of said display electrodes;

a plurality of first row drive lines each provided for and extending between every two adjacent rows of said display electrodes, said first transistors connected to corresponding ones of said display electrodes on the opposite sides of each said first row drive line having their respective gates commonly connected to said first row drive line;

a plurality of column drive lines provided in pairs for respective columns of said display electrodes, said column drive lines in each pair extending along opposite sides of a corresponding column of said display electrodes, said first transistors connected to respective said display electrodes in said corresponding column having their respective sources connected alternately to one and the other of said pair of column drive lines;

a plurality of second row drive lines each provided for and extending between every two adjacent rows of said display electrodes between adjacent ones of said first row drive lines;

a plurality of second thin film transistors each having a source, drain and gate formed adjacent corresponding ones of said display electrodes each of said second transistors having its drain connected to a corresponding one of said display electrodes, said second transistors connected to said corresponding ones of said display electrodes on the opposite sides of each said second row drive line having their respective gates commonly connected to said second row drive line, and each of said second transistors having its source connected to one of a corresponding pair of said column drive lines other than the one to which the source of a corresponding one of said first transistors is connected;

row drive means connected to said first and second row drive lines for driving said plurality of first row drive lines one after another in synchronism with the horizontal scanning cycle of a video signal for each odd scanning field, and for driving said plurality of second row drive lines one after another in synchronism with the horizontal scanning cycle of the video signal for each even scanning field; and column drive means supplied with said video signal for each scanning line and having a plurality of drive stages equal in number to said plurality of column drive lines and connected thereto, respectively, for driving said column drive lines according to the outputs of corresponding said stages.

2. The planar display device according to claim 1 wherein red, green and blue color filters are provided on respective said display elements to form three-color display element sets such that said color filters are substantially uniformly distributed as a whole, two of the three color display elements in each set in a column and the other color display element in an adjacent column constituting one picture point with respect to a first row drive line.

3. The planar display device according to claim 2 wherein said video signal consists of serial pixel signals each consisting of parallel red, green and blue color element signals, and said device further comprises a shift register supplied with a horizontal sync pulse as data which is shifted in said register under control of a clock signal at three times the frequency of the color pixel signals, first to third color signal buses through which the three color element signals are successively and repeatedly supplied to corresponding stages of said column drive means according to the data shifted through said shift register, and means for switching the connection between input lines, to which said red, green and blue color element signals are supplied, and said first two third color signal buses, in synchronism with said horizontal sync pulse.

4. The planar display device according to claim 1 wherein red, green and blue color filters are provided on respective said display elements to form three-color display element sets such that said color filters are substantially uniformly distributed as a whole, two of the three color display elements in each set in a column and the other color display element in an adjacent column constituting one picture point with respect to a first row drive line.

5. The planar display device according to claim 2 or 4 comprising:

first to third color signal buses, to which red, green and blue color element signals constituting each of a series of pixel signals are supplied in parallel;

delay means connected to said first to third color signal buses for delaying each of the red, green and blue color element signals for one cycle period of said pixel signals;

fourth to sixth color signal buses connected to the output side of said delay means for delivering said red, green and blue color element signals each delayed for one cycle period of said pixel signals;

a shift register which is supplied with the horizontal sync pulses of said video signal as data, and which is also supplied with a clock signal as a shift clock of one half the frequency of the pixel signals, for producing a plurality of timing signals at respective stages of said shift register; and a plurality of column registers each supplied with the color element signals on said first to sixth color signal buses in response to the timing signals from the respective stages of said shift register for supplying six outputs of each said column register to corresponding ones of said column drive lines.

6. The planar display device according to one of claims 1, 2, 3 and 4 wherein said planar display device is a liquid crystal display device.

* * * * *